United States Patent
Morris et al.

(10) Patent No.: US 11,666,047 B2
(45) Date of Patent: Jun. 6, 2023

(54) CONTAINER FOR CRYOPRESERVED SAMPLES

(71) Applicant: Asymptote Ltd., Cambridgeshire (GB)

(72) Inventors: George Morris, Cambridgeshire (GB); Christopher Creasey, Cambridgeshire (GB)

(73) Assignee: ASYMPTOTE LTD., Cambridge (GB)

( * ) Notice: Subject to any disclaimer, the term of this patent is extended or adjusted under 35 U.S.C. 154(b) by 258 days.

(21) Appl. No.: 16/955,130

(22) PCT Filed: Dec. 17, 2018

(86) PCT No.: PCT/EP2018/085343
§ 371 (c)(1),
(2) Date: Jun. 18, 2020

(87) PCT Pub. No.: WO2019/121586
PCT Pub. Date: Jun. 27, 2019

(65) Prior Publication Data
US 2020/0305417 A1      Oct. 1, 2020

(30) Foreign Application Priority Data

Dec. 21, 2017   (GB) ..................... 1721588

(51) Int. Cl.
| | | |
|---|---|---|
| *A01N 1/02* | (2006.01) | |
| *F17C 3/08* | (2006.01) | |
| *F25B 9/14* | (2006.01) | |
| *F25D 3/10* | (2006.01) | |
| *F25D 11/04* | (2006.01) | |

(52) U.S. Cl.
CPC ............. *A01N 1/0257* (2013.01); *F17C 3/08* (2013.01); *F25B 9/14* (2013.01); *F25D 3/105* (2013.01); *F25D 11/04* (2013.01)

(58) Field of Classification Search
CPC . A01N 1/0257; F17C 3/08; F25B 9/14; F25D 3/105; F25D 11/04
See application file for complete search history.

(56) References Cited

U.S. PATENT DOCUMENTS

2006/0260328 A1\* 11/2006 Rampersad .......... A01N 1/0257
                                                                  62/6
2011/0309086 A1    12/2011 Arnitz et al.
(Continued)

FOREIGN PATENT DOCUMENTS

AU       200057923 A1     3/2001
CN       106081363 A  \* 11/2016 ............. B65D 81/18
(Continued)

OTHER PUBLICATIONS

CN-106081363-A translation.\*
(Continued)

*Primary Examiner* — Elizabeth J Martin
(74) *Attorney, Agent, or Firm* — Eversheds Sutherland (US) LLP

(57) ABSTRACT

Containers (100) for cryopreserved biological samples (102) may include an insulated housing including a cavity (108) for containing at least one cryopreserved biological sample; and a sealed reservoir (106) at least partly surrounding the cavity, the sealed reservoir including liquified gas (120) such as liquified air, the gas being kept largely liquified by a heat transfer engine (112) such as a Stirling cryocooler. A valve (114) may be provided to function as both a pressure relief valve and an inlet valve. The inlet valve may be coupled to a sensor (122) for sensing a volume of liquified gas within the sealed reservoir. The container may further include a heat exchanger (116) coupled to the heat engine and extending into the sealed reservoir.

25 Claims, 5 Drawing Sheets

(56) References Cited

U.S. PATENT DOCUMENTS

| | | |
|---|---|---|
| 2012/0079990 A1 | 4/2012 | Fuhr et al. |
| 2013/0111931 A1 | 5/2013 | Grinter et al. |
| 2017/0059225 A1 | 3/2017 | Berchowitz et al. |

FOREIGN PATENT DOCUMENTS

| | | | |
|---|---|---|---|
| CN | 106081363 A | 11/2016 | |
| CN | 106871546 A | 6/2017 | |
| CN | 206453077 U | 9/2017 | |
| EP | 1376033 A2 | 1/2004 | |
| EP | 2041503 B1 | 11/2018 | |
| GB | 2225847 A | 6/1990 | |
| JP | H05-231757 A | 9/1993 | |
| JP | 2001141346 A | 5/2001 | |
| JP | 2014504716 A | 2/2014 | |
| WO | 2006/125060 A2 | 11/2006 | |
| WO | WO-2008009840 A1 * | 1/2008 | ............... A01N 1/02 |

OTHER PUBLICATIONS

WO-2008009840-A1 translation.*
PCT International Search Report and Written Opinion for PCT Application No. PCT/EP2018/085343 dated Apr. 3, 2019 (13 pages).
GB Search Report for GB Application No. 1721588.0 dated Jun. 4, 2018 (10 pages).
Office Action Issued in Japanese Patent Application No. 2020-534549, dated Nov. 28, 2022 with English Summary (10 pages).

* cited by examiner

CONTAINER FOR CRYOPRESERVED SAMPLES

CROSS REFERENCE TO RELATED APPLICATIONS

This application claims the priority benefit of PCT/EP2018/085343 filed on Dec. 17, 2018, which claims priority to Great Britain Patent Application No. 1721588.0 filed Dec. 21, 2017, the entire contents of which are hereby incorporated by reference herein.

FIELD OF THE INVENTION

The present invention relates to a container for cryopreserved samples, for example biological samples, in which a cryopreserved sample can be maintained on arrival at its destination for an extended period of time, for example months, and can also possibly be used for controlled rate freezing and thawing. The containers of the invention could also be used for shipping other types of samples that require cryogenic storage without the use of conventional cryogenic materials such as liquid nitrogen or solid carbon dioxide.

BACKGROUND TO THE INVENTION

Cryopreservation is a technique used for the preservation of biological samples that involves cooling samples to, and maintaining them for prolonged periods at, very low temperatures, for example −78.5° C. to −196° C. By cooling a biological sample to a low temperature, the kinetics of chemical or enzymatic reactions that would otherwise degrade the sample are slowed to such an extent that the sample no longer degrades or only degrades at a very slow rate. As a result, biological samples can be stored over prolonged periods and then brought back to ambient temperature as required for use and/or analysis.

Cryopreserved samples can be transported if their temperature is maintained at a sufficiently low temperature during transit. If the sample is allowed to warm above a certain temperature, for example above the glass transition point of the sample, the integrity of the sample can be compromised. This is because the cryoprotective agents used in the cryopreservation process have a degree of toxicity towards the sample and more diffusion and therefore more chemical reactions can occur which can affect the viability of the stored cells. Prolonged exposure to the cryoprotective agents and chemical reactions at higher temperatures and their cumulative effects causes damage to the cryopreserved material. Below the glass transition temperature the viscosity of the system means that cumulative effects are very small. During cryopreservation cooling from the cell's ambient temperature needs to be done in a controlled way to minimise damage and optimise cell viability post thaw. It is therefore evident that to ensure sample integrity in shipping the cryopreserved sample must be kept cold enough for the cumulative damaging effects not to be significant in the anticipated period of transportation and storage.

In addition to the need to maintain an adequately low temperature during transit the shipping container and its contents must be compatible with the environments it passes through before, during and after transit. Thus, in the case of airfreight it is unacceptable on safety grounds for a phase transition coolant such as liquid nitrogen to be used if there is a risk of spillage of the liquid nitrogen. To circumvent this problem, dry shippers, Dewar vessels with porous materials such as molecular sieves or zeolites, have been developed to ensure that low temperature shipping can be achieved without the risk of liquid nitrogen spillage. In such Dewars liquid nitrogen is absorbed into the porous material and is retained therein until it boils off as gaseous nitrogen.

A problem associated with these dry shippers is that the porous materials are easily contaminated, for example with particulate biological material from the liquid nitrogen that remains in the dry shipper must be sterilised between each use and this makes their use in sterile environments such as operating theatres and clean room highly undesirable Additionally, the Dewar vessel is a vacuum jacketed vessel and to ensure equal pressure distribution on the vessel walls the shape of the vessel must be approximately cylindrical or spherical as avoiding catastrophic failure requires thicker materials and therefore poorer performing Dewars. A combination of these factors means that the dry shippers are generally in the form of a cylindrical or spherical Dewar with a relatively narrow aperture at one end through which charging with liquid nitrogen and sample occurs. A typical dry shipper has a bore that projects radially from the central axis of the Dewar's mouth. The porous material in which the liquid nitrogen is absorbed is provided in the ring between the outer wall of the bore and the innermost wall of the Dewar and this dictates that the porous material (i.e. the molecular sieve element) cannot be removed and replaced easily and in any case not without first extracting the sample.

Simpler shipping containers containing a phase transition cooling material such as solid carbon dioxide as the coolant (cryogen) can also be used for shipping cryopreserved samples and consist of an insulated vessel, for example a Dewar or an insulated box, containing the sample on or immersed in a bed of solid carbon dioxide. The problem with such containers is that they are only capable of maintaining the sample at a low temperature for a relatively modest period of time and are unsuitable for shipping or storage over large time scale without frequent recharging of the phase transition cooling material. Solid carbon dioxide has a temperature of approximately −78.5° C. which is above the glass transition temperature of many cryoprotective agents and this temperature may not be low enough to prevent damage to the sample before, during, or after transport over longer timescales (days).

Developments in medicine mean that there is a growing need to ship and maintain cryopreserved samples in environments where cryogenic materials (liquid nitrogen, solid carbon dioxide etc.) and storage facilities are not available and/or practical. For example, the field of immunotherapy is rapidly developing and has significant potential for therapy, for example in the treatment of cancers such as leukaemia and melanoma. In one approach T-cells are harvested from a patient's blood and then genetically engineered to introduce chimeric antigen receptors (CARs) on their surface. The resultant chimeric antigen receptor T-cells (CAR T-cells) are then grown up in the lab to provide a sufficient number for therapy and are in turn transfused into the original patient. The CAR T-cells can then recognise the relevant protein antigen on the tumour cell's surface and in turn recruit the patient's immune system to kill those cells. This process requires the transfer of the blood and/or tissue samples to a laboratory capable of performing the genetic engineering thereon and then growing the requisite number of CAR T-cells. In addition, the CAR T-cells must then be shipped back to the patient's own clinic and stored until the patient is ready for treatment. This typically requires storage of the cryopreserved CAR T-cell sample(s) at the clinic for a period of several weeks or more and this demands either construction of a local cryopreservation facility or provision of a shipping container that can also serve as a storage unit on arrival. It is an object of the present invention to provide such a shipping container.

SUMMARY

In a first aspect of the invention, there is provided a container for cryopreserved biological samples, the container comprising: an insulated housing comprising a cavity for containing at least one cryopreserved biological sample; and a sealed reservoir at least partly surrounding the cavity of the housing, the sealed reservoir comprising liquified gas.

In a second aspect of the invention, there is provided a method of monitoring the volume of liquified gas within a container of the type described herein, the method comprising: determining whether at least one sensor indicates that the volume of liquified gas is below a required volume and/or that evaporated liquified gas is flowing out of the sealed reservoir; and sending a control signal to switch on the heat engine, to condense any evaporated liquified gas in the sealed reservoir of the container.

In a third aspect of the invention, there is provided a method of monitoring integrity of a container of the type described herein, the method comprising: determining whether a measured power consumption of the heat engine of the container exceeds an expected power consumption; and outputting a report, responsive to the determining, on the integrity of the container if the measured power consumption exceeds an expected power consumption.

According to a related aspect of the present invention, there is provided a non-transitory data carrier carrying code which, when implemented on a processor, causes the processor to carry out any of the methods described herein.

As will be appreciated by one skilled in the art, embodiments of the present techniques may be embodied as a system, method or computer program product. Accordingly, present techniques may take the form of an entirely hardware embodiment, an entirely software embodiment, or an embodiment combining software and hardware aspects.

Furthermore, embodiments of the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION

Figure 1:
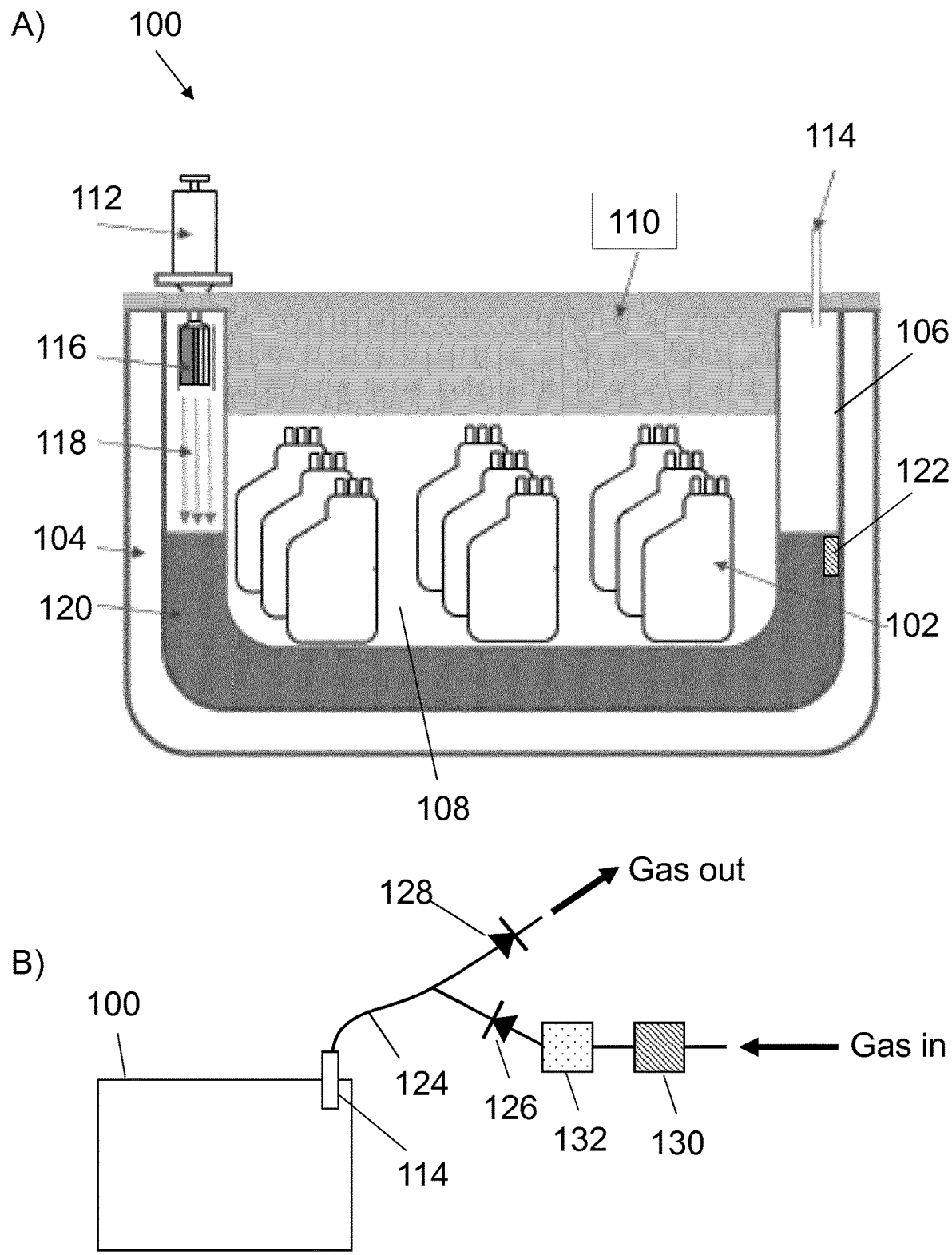
FIG. 1A shows a schematic diagram of a container for cryopreserved samples.
FIG. 1B shows a schematic diagram of an airflow mechanism of the container of FIG. 1A.
FIG. 1C shows a schematic block diagram showing selected components of the container of FIG. 1A.

Many types of biological materials are cryopreserved for subsequent application in medicine, biotechnology and veterinary sciences. To ensure long term viability it is considered essential to maintain the samples at temperatures below 150K. A convenient way to achieve such low temperatures is by the use of liquid nitrogen (which has a boiling point of 77K). Following the addition of cryoprotective additives and controlled rate freezing, samples in specialist cryo-containers are either immersed in liquid nitrogen or in the vapour phase above liquid nitrogen, which is usually contained in a Dewar vessel. The liquid nitrogen evaporates and is replenished with fresh liquid nitrogen, which may be carried out manually or by automated top up systems from large Dewars or storage tanks. As an alternative to liquid nitrogen, mechanical freezers which operate at 120K have been developed.

However, a number of problems exist with current cryogenic storage methods. For example, liquid nitrogen is expensive and may be difficult to obtain in some geographical locations. Health and safety issues may arise in relation to the storage and handling of large volumes of liquid nitrogen. Furthermore, following manufacture, liquid nitrogen may contain very low levels of contaminants, and during transport and storage, further contamination may occur. Accordingly, liquid nitrogen must always be considered to be contaminated with viable micro-organisms. Contamination of liquid nitrogen by ice, inanimate debris and viable micro-organisms is documented and a number of reports have demonstrated the transfer of contaminants from liquid nitrogen to its vapour. In principle it is possible to filter liquid nitrogen, however this may require specialist equipment and the filtering procedure may need to be validated to prove that contaminants are removed each time the filtering procedure is performed. If validation is not possible, liquid nitrogen cannot be used in a clean room without compromising the air quality. Further still, to achieve cryogenic temperatures, mechanical freezers conventionally employ cascade compressors, which tend to be large, noisy and expensive.

Broadly speaking, the present techniques relate to containers for cryopreserved biological samples, which comprise a supply of liquified gas for keeping the cryopreserved biological samples at the required temperatures while the samples are being stored and/or shipped. The container described herein comprises a sealed reservoir containing at least a liquified gas, which is used to keep cryopreserved biological samples at the required temperatures but without the liquified gas directly contacting the samples. Evaporation of the liquified gas within the sealed reservoir may be mitigated by providing a means within the container to condense evaporated liquified gas, such that the liquified gas within the sealed reservoir is maintained at a volume required to keep the samples within the container at the required temperature.

Embodiments of the container may advantageously remove or substantially reduce the possibility of the biological samples being contaminated by the liquified gas or by evaporated liquified gas. Furthermore, by providing a sealed reservoir containing a liquified gas within the container, it may be possible to use the same supply of liquified gas for a substantially long time, which solves the problem of not being able to obtain liquified gas in some geographical locations. Further still, as the same supply can be used and reused once it is provided within the sealed reservoir, the health and safety concerns may be reduced, as a user of the container may not need to come into contact with the liquified gas, particularly when placing samples into the container or removing them from the container.

FIG. 1A shows a schematic diagram of a container 100 for storing and/or shipping cryopreserved samples 102, such that the cryopreserved samples within the container 100 are maintained at a required temperature for an extended period of time to ensure sample integrity. The cryopreserved samples 102 may be cryopreserved biological samples, or any type of samples that require cryogenic storage without the use of conventional cryogenic materials such as liquid nitrogen or solid carbon dioxide.

The container 100 comprises an insulated housing comprising a cavity 108 for containing at least one cryopreserved biological sample 102, and a sealed reservoir 106 at least partly surrounding the cavity 108 of the housing. In embodiments, the sealed reservoir 106 may comprise liquified gas 120, which is provided in the sealed reservoir from at least one external source (not shown). The liquified gas 120 may be any one or more of liquified helium, liquified nitrogen, liquified air, and liquified oxygen, though it will be understood that this is a non-exhaustive and non-limiting list of suitable materials. Additionally or alternatively, the sealed reservoir 106 may comprise liquified gas that has been adsorbed into a suitable material.

The sealed reservoir 106 comprises at least one valve 114. The at least one valve 114 may be a relief valve, pressure relief valve, or safety valve for controlling or limiting the pressure within the sealed reservoir 106. The relief valve may be designed to automatically open when a predetermined pressure is reached within the sealed reservoir 106. The relief valve may be provided in case of failure of mechanism within the container to condense/re-liquify evaporated liquified gas (which may result in gas build-up within the sealed reservoir 106), interruption of power to this mechanism, or failure of the insulation of the container 100.

Figure 1C:
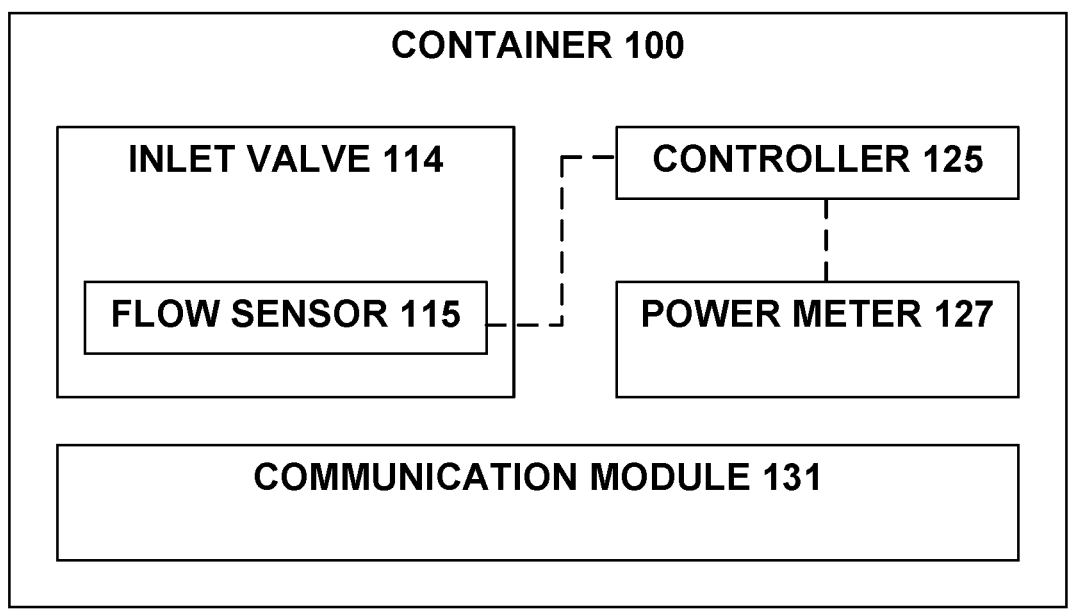

In embodiments, the at least one valve 114 may be, or may comprise, a flow sensor 115. The flow sensor 115 may be used to determine if gas is entering or leaving the sealed reservoir 106. For example, if gas is determined to leave the sealed reservoir 106, this may indicate a leak either pressure relief is taking place or that there is a leak that is enabling gas to escape the sealed reservoir 106 (which may mean that the supply of liquified gas 120 needs to be topped-up more frequently). The flow sensor 115 (not shown in FIG. 1A, shown in FIG. 1C) may be coupled to a controller 125, such that if the flow sensor indicates that gas is escaping from the sealed reservoir, the controller 125 can take action to remedy the situation. For example, the controller 125 may cause a cryocooler to switch-on to cool/condense the gas, and thereby reduce or stop the flow of gas out of the sealed reservoir 106. This is described in more detail below.

The at least one valve 114 may be an inlet valve for filling the sealed reservoir 106 with gas (that will be condensed within the reservoir to provide liquified gas) or with liquified gas 120. Thus, the inlet valve may be couplable to an external source of gas/liquified gas 120, such that the gas/liquified gas can flow into the sealed reservoir 106. In embodiments, the inlet valve may be coupled to at least one sensor 122 within the sealed reservoir 106. The at least one sensor 122 may be a sensor for sensing a volume of liquified gas 120 within the sealed reservoir 106. The inlet valve 114 may be configured to automatically close when the at least one sensor 122 indicates that the required volume of liquified gas 120 has been obtained in the sealed reservoir 106. In embodiments, there may be at least two 'fill sensors' 122 in the sealed reservoir 106—one may be used to determine if a minimum required volume of liquified gas 120 is present in the sealed reservoir 106, and another may be used to determine if a maximum volume of liquified gas 120 is present in the sealed reservoir 106. In such embodiments, the inlet valve 114 may remain open until the sensors indicate that a maximum volume of liquified gas 120 has been reached.

In embodiments, liquified air may be used in the sealed reservoir 106 to keep the samples 102 in cavity 108 at the required cool temperatures. Liquified air is air that has been cooled to very low temperatures such that it has condensed and become a liquid. Air from the external environment may be pumped into the sealed reservoir 106 of container 100, where it is cooled to form liquified air. Air, and liquified air, typically comprises nitrogen, oxygen, argon and other inert gases. Using air or liquified air as the means to provide cooling to the samples 102 may be advantageous because a separate, dedicated supply of gas/liquid does not need to be provided to the container 100 (e.g. a canister of liquid nitrogen). Instead, air from the environment surrounding the container 100 may be input into the container and cooled (condensed) to a cryogenic temperature. This may lower operation costs of the container 100.

However, problems may occur when the liquified air begins to warm-up and evaporate. The boiling point of liquid air is between the boiling points of liquid nitrogen and liquid oxygen. As a result, as the liquid air boils and evaporates (because the mechanism to cool/condense the air has been switched-off, for example), the nitrogen component evaporates more rapidly than the oxygen component of the liquid air. This may result in a liquid air mixture that contains up to approximately 50% concentration of oxygen. Liquid oxygen contains 4000 times more oxygen by volume than normal air, and materials that are usually considered non-combustible (such as carbon, stainless steel, aluminium in powdered form, etc.) may burn in the presence of liquid oxygen. Accordingly, it may be desirable to reduce, minimise or eliminate the build-up of liquid oxygen within the container.

Thus, in embodiments, the at least one valve 114 may be coupled to an airflow mechanism for reducing or eliminating the build-up of liquid oxygen and frost within the container 100. An example airflow mechanism is shown in FIG. 1B. The airflow mechanism may enable gas to flow into the sealed reservoir 106 of the container 100, and may enable gas (e.g. evaporated—and therefore, warm—liquified gas) to flow out of the sealed reservoir 106. The airflow mechanism may comprise a pipe 124 which is couplable to valve 114. Pipe 124 may be bifurcated or shaped into a first branch and a second branch, as shown in FIG. 1B. An inlet is provided on the first branch of pipe 124, to enable gas (e.g. air from the external environment) to flow into the sealed reservoir 106 of container 100. A one-way valve 126 is provided along the first branch, which may prevent evaporated air from within the sealed reservoir to flow along the first branch and impact the functionality of the inlet. An outlet is provided on the second branch of pipe 124, to enable gas (including evaporated liquified gas) to flow out of the sealed reservoir 106. A one-way valve 128 is provided along the second branch of pipe 124, which may prevent gas from outside of the container 100 from flowing through the second branch and into the sealed reservoir.

In embodiments, to reduce build-up of liquid oxygen within the sealed reservoir 106, the airflow mechanism may comprise a chamber 130 located between the inlet and the one-way valve 126 on the first branch of pipe 124. The chamber 130 may contain an oxygen scavenger. An oxygen scavenger, or oxygen absorber, is a material that helps to remove or decrease the level of oxygen. The oxygen scavenger may be an iron-based oxygen scavenger, or may be a non-ferrous oxygen scavenger. Thus, oxygen from the gas (e.g. air) that flows into the inlet of pipe 124 may be at least partly removed, which reduces the potential build-up of liquid oxygen when the gas is condensed within the sealed reservoir 106. In embodiments, chamber 30 may be removably provided on the first branch of pipe 124. This may enable the entire chamber 130 to be removed to enable the oxygen scavenger to be disposed of and replaced with fresh oxygen scavenging material. In embodiments, the entire chamber 130 may be disposed of, and replaced with a new chamber 130 containing fresh oxygen scavenging material. Additionally or alternatively, the chamber 130 may be openable in situ to enable the oxygen scavenger to be removed and replaced with fresh material.

In embodiments, to reduce build-up of frost within the sealed reservoir 106 (which may reduce the cooling potential of the condensed gas), the airflow mechanism may comprise a chamber 132 located on the first branch of pipe 124. If no chamber 130 is provided, the chamber 132 is located between the inlet and the one-way valve 126 on the first branch of pipe 124. If chamber 130 is also present, chamber 132 is located between chamber 130 and the one-way valve 126 on the first branch of the pipe 124, i.e. after the chamber containing the oxygen scavenging material. Chamber 132 contains a desiccant or other suitable material for absorbing moisture/water from the input gas. Removing moisture/water from the input air reduces the potential for frost or ice to form within the container 100, and particularly in the sealed reservoir 106. Frost or ice may reduce the efficiency of the cooling provided by the condensed gas, by inhibiting thermal energy transfer between the sealed reservoir 106 and the cavity 108. The chamber 132 may be removably provided on the first branch of pipe 124.

This may enable the entire chamber 132 to be removed to enable the desiccant to be disposed of and replaced with fresh desiccant. In embodiments, the entire chamber 132 may be disposed of, and replaced with a new chamber 132 containing fresh desiccant. Additionally or alternatively, the chamber 132 may be openable in situ to enable the desiccant to be removed and replaced with fresh material.

In embodiments, a single valve 114 may be able to function as both a pressure relief valve and an inlet valve.

Thus, in embodiments, the at least one valve 114 is an inlet valve for filling the sealed reservoir with gas or liquified gas. The inlet valve may be coupleable to an airflow mechanism to enable gas to flow into the sealed reservoir (where it can be condensed to provide liquified gas), and to enable evaporated gas to flow out of the sealed reservoir. The airflow mechanism may comprise at least one chamber located between a gas inlet and the inlet valve. The at least one chamber may contain an oxygen scavenger or a desiccant. In embodiments, a flow sensor may be provided within the inlet valve to detect fluid flow in and/or out of the sealed reservoir, and in particular to detect the flow of evaporated liquified gas out of the reservoir.

The container 100 may comprise a heat engine 112 for condensing gas in the sealer reservoir 106 to provide liquified gas, and/or for cooling the liquified gas 120 in the sealed reservoir 106. The heat engine may be a cryocooler, Kleemenco cycle cryocooler, pulse tube cryocooler, "acoustic Stirling" cryocooler, Joule Thompson cryocooler, Stirling cryocooler (also known as a Stirling engine), or any other suitable means of refrigeration. In embodiments, the heat engine may be a Stirling cryocooler having at least 20 W cooling capacity at 77K. The heat engine 112 may be used to condense/re-liquify evaporated liquified gas within the sealed reservoir 106, to maintain the level of/volume of cryogen within the container 100.

The container 100 may comprise a heat exchanger 116 coupled to the heat engine 112. The heat exchanger 116 may extend into the sealed reservoir 106 to provide cooling to the liquified gas 120, as shown in FIG. 1A. Accordingly, the heat exchanger 116 may be able to extract heat from the top of the sealed reservoir 106, in order to cool the liquified gas 120 and to condense any evaporated liquified gas 120 which may rise to the top of the sealed reservoir 106. Arrows 118 show the direction of flow of condensate formed when the heat engine 112 and heat exchanger 116 are switched on.

When liquified gas in the sealed reservoir 106 evaporates, the evaporated liquified gas rises to the top of the sealed reservoir 106, where it may be in proximity to the heat exchanger 116, which is coupled to the heat engine 112. The heat engine 112 may be operating at a temperature below the saturation temperature at the pressure of the liquified gas in the sealed reservoir 106 (e.g. 77K for liquefaction at 1 bar for liquid nitrogen), to achieve liquefaction/condensation of the evaporated liquified gas. When not being employed to liquefy a gas, the heat engine 112 may be used to reduce the temperature of the liquified gas within the sealed reservoir 106, and thereby reduce evaporation.

As mentioned above, the container 100 may comprise at least one sensor 122 in the sealed reservoir 106 for sensing a volume or level of liquified gas 120 within the sealed reservoir 106. It will be understood that the position of the sensor 122 in FIG. 1A is illustrative and non-limiting.

The container 100 may comprise at least one controller (not shown in FIG. 1A) coupled to the at least one sensor 122. The controller 100 may be configured to: determine whether the at least one sensor 122 indicates that the volume of liquified gas 120 is below a required volume; and send a control signal to the heat engine 112 to switch on the heat engine, to thereby condense any evaporated liquified gas in the sealed reservoir 106.

As mentioned above, the at least one valve 114 may be, or may comprise, a flow sensor, which may detect gas flow into and/or out of the sealed reservoir 106. The flow sensor may be coupled to the controller, such that if the flow sensor indicates that gas is escaping from the sealed reservoir, the controller can take action to remedy the situation. For example, the controller may send a signal to heat engine 112 to switch-on to cool/condense the gas, and thereby reduce or stop the flow of gas out of the sealed reservoir 106. The controller may send a signal to heat engine 112 to switch-off when the flow sensor indicates that the gas flow out of the sealed reservoir 106 has reduced significantly or stopped, as this may be indicative of the re-condensation of evaporated liquified gas in the sealed reservoir 106. The flow sensor may enable the controller to provide a faster response than a level/volume sensor 122.

In embodiments, the controller may be further configured to: determine whether, after a specified time, the at least one sensor 122 indicates that the volume of liquified gas 120 is below a required volume; send a control signal to the heat engine 112 to switch off the heat engine; and output a message, responsive to the determining, indicating that liquified gas needs to be added to the sealed reservoir 106. The specified time may be a time after which it is expected that the required volume will be reached. This may be determined from experiments/calibration of the container 100. In embodiments, the controller may be able to determine from the data from the at least one sensor 122 how much of a volume deficit there is within the sealed reservoir 106 (i.e. the difference between the required volume and the sensed volume), how long the heat engine 112 must be switched-on for in order to reach the required volume. This may determine the specified time after which the sensor(s) may be polled again.

In embodiments, container 100 may comprise a power meter 127 (not shown in FIG. 1A, shown in FIG. 1C) for measuring power consumption of the heat engine 112 when switched on/being used to cool the sealed reservoir 106.

The above-mentioned controller, or a further controller, may be coupled to the power meter. The controller may be configured to: determine whether the measured power consumption of the heat engine 112 exceeds an expected power consumption; and output a report, responsive to the determining, on the integrity of the container 100 if the measured power consumption exceeds an expected power consumption. In this way, the integrity of the container 100 may be determined. For example, if the heat engine 112 is determined to be using more power than expected, then the container 100 may not be well-insulated or there may be a leak in the sealed reservoir which is causing liquified gas to evaporate or leak out of the container 100.

The container 100 may comprise a communication module 131 (not shown in FIG. 1A, shown in FIG. 1C) for communicating information to any one or more of: a user of the container; a remote server; a manufacturer or supplier of the container; an electronic display; an electronic device. For example, the reports on the integrity of the container and/or the message regarding topping-up the reservoir with more liquified gas, may be communicated to a user or to a device/server external to the container 100 so that the relevant action can be taken.

The container 100 may comprise vacuum insulation/a vacuum insulation layer 104. The vacuum insulation 104 may be provided by one or more vacuum insulated panels. As shown in FIG. 1A, the vacuum insulation surrounds the sealed reservoir 106 and the cavity 108, to prevent both the liquified gas in the sealed reservoir 106 and the samples 102 in the cavity 108 from heating-up. In contrast, the sealed reservoir 106 at least partly surrounds the cavity 108 such that the cold liquified gas is able to keep the cavity 108 and samples 102 at the required temperature.

The container 100 may comprise a removable insulated lid or cover 110, wherein the housing and the cavity 108 are sealable by the removable lid 110.

The container 100 described herein may be for storing cryopreserved biological samples and/or for shipping cryopreserved biological samples.

Figure 2:
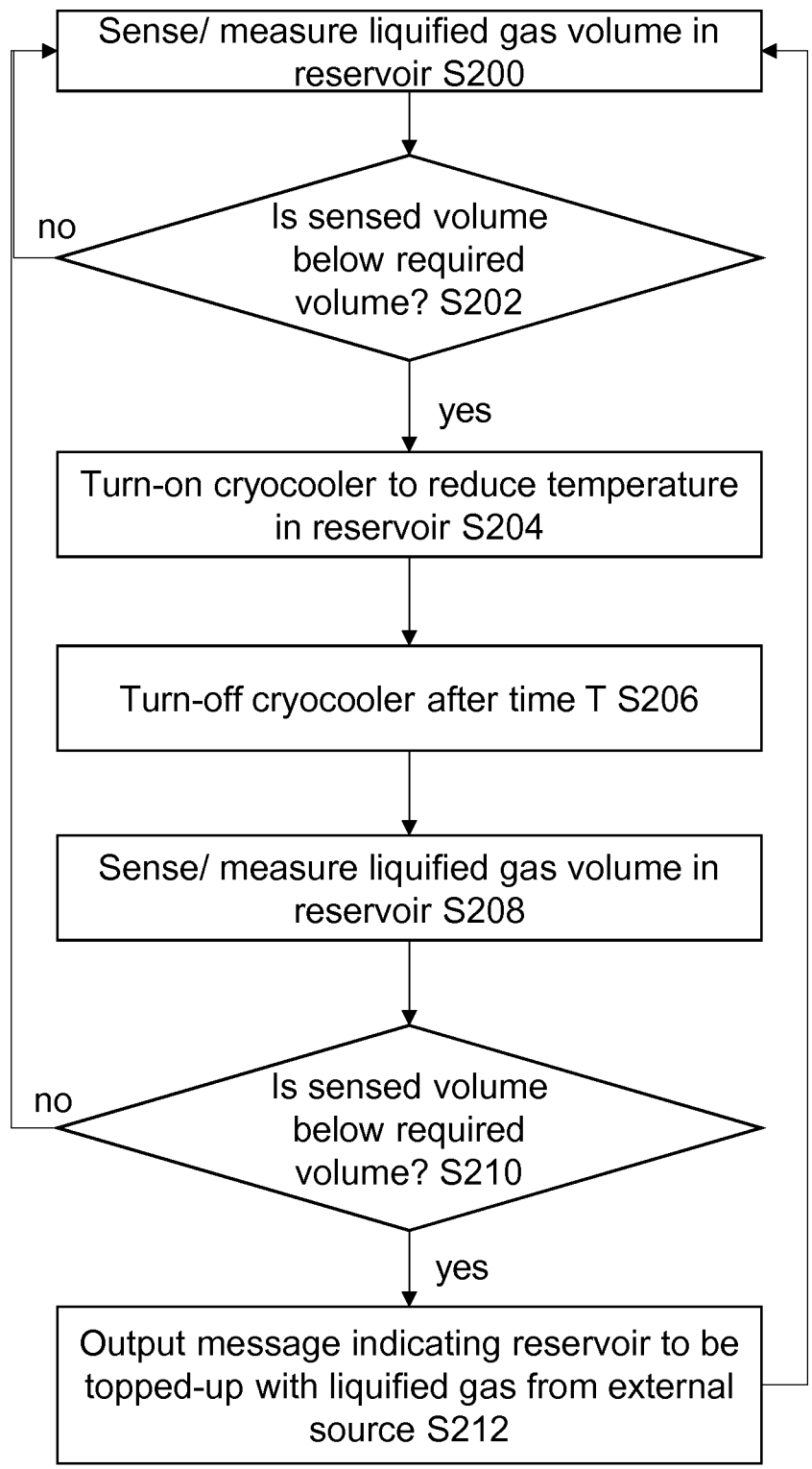
FIG. 2 is a flow diagram of example steps to monitor the volume of liquified gas within the container of FIG. 1A.

FIG. 2 is a flow diagram of example steps to monitor the volume of liquified gas within the container of FIG. 1A. At step S200, the at least one sensor 122 is used to sense/measure the volume of liquefied gas in the sealed reservoir 106. A controller or processor (or similar component(s)) determine, using the sensor data, whether the sensed volume of liquified gas is below the required volume (step S202). The required volume is a volume needed to ensure the cavity 108 of the container 106, and therefore the samples 102, are at a required temperature for ensuring sample integrity. If the sensed volume is equal to or greater than the required volume, the process returns to step S200. If the sensed volume is below the required volume, the controller sends a control signal to switch on the heat engine 112, to thereby condense any evaporated liquified gas in the sealed reservoir 106 and to reduce the temperature in the reservoir (step S204).

After a specified time T, the controller may send a control signal to switch off the heat engine 112 (step S206). Data from the at least one sensor 122 may be read again to determine the current volume of liquified gas in the sealed reservoir 106 (step S208). The specified time may be a time after which it is expected that the required volume will be reached. This may be determined from experiments/calibration of the container 100. In embodiments, the controller may be able to determine from the data from the at least one sensor 122 how much of a volume deficit there is within the sealed reservoir 106 (i.e. the difference between the required volume and the sensed volume), how long the heat engine 112 must be switched-on for in order to reach the required volume. This may determine the specified time after which the sensor(s) may be polled again. (As mentioned above, the flow sensor in valve 114 may be used in addition to or instead of the level/volume sensor 122 to determine when the heat engine 112 may need to be switched-on to counteract evaporation of the liquified gas in the sealed reservoir 106. The flow sensor may give a better and faster response than a level/volume sensor 122).

At step S210, the controller determines whether the sensed volume is still below the required volume. If the sensed volume is at least equal to the required volume, the process returns to step S200. If the sensed volume is still below the required volume, the controller may be configured to output a message or control signal indicating that liquified gas needs to be added to the sealed reservoir 106 (i.e. that the sealed reservoir 106 needs to be topped-up with more liquified gas from an external source) (step S212). As mentioned above, this may be achieved by using the communication module to communicate with a user of the container or with external devices/servers. In embodiments, at step S212, the controller may cause a warning light or similar to be displayed or for an alarm to be sounded if liquified gas needs to be added to the container. After the reservoir has been topped-up (either with gas that is condensed to provided liquified gas, or with liquified gas) such that the required volume of liquified gas is achieved, the process returns to step S200.

Figure 3:
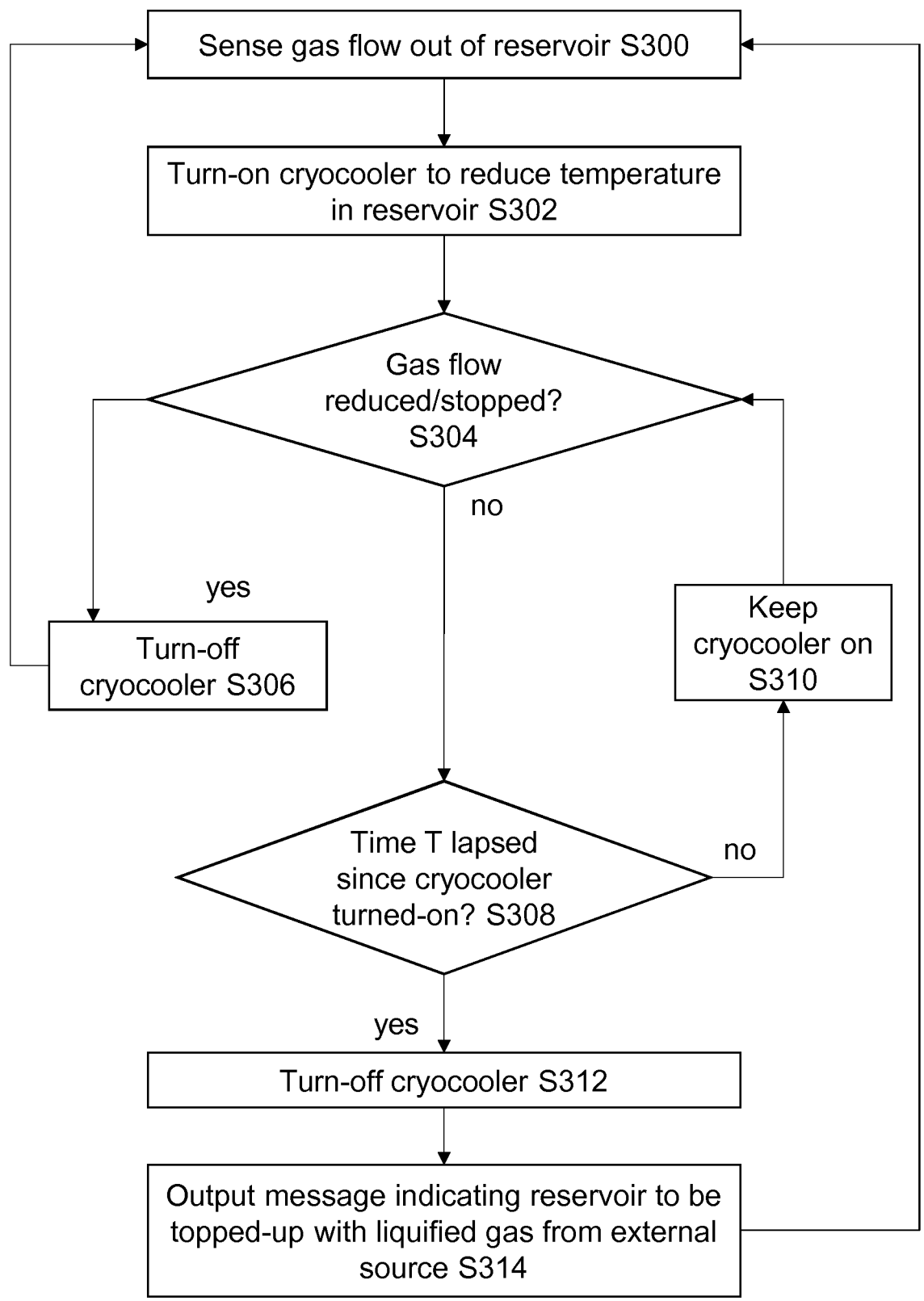
FIG. 3 is a flow diagram of example steps to monitor fluid flow out of the container of FIG. 1A.

FIG. 3 is a flow diagram of example steps to monitor fluid flow out of the container of FIG. 1A, and in particular the flow of evaporated liquified gas out of the sealed reservoir 106 of container 100. At step S300, the flow sensor in valve 114 is used to detect/sense flow of evaporated liquified gas out of the sealed reservoir 106. A controller or processor (or similar component(s)) instructs, responsive to the flow sensor data, the cryocooler/heat engine 112 to switch-on to cool the liquified gas in the sealed reservoir and condense any evaporated liquified gas in the sealed reservoir, to thereby stop or substantially reduce the flow of evaporated liquified gas out of the sealed reservoir 106 (step S302).

The controller continues to either receive data from the flow sensor, or to regularly poll the flow sensor, in order to determine if gas flow out of the sealed reservoir 106 has significantly reduced or stopped (step S304). If the flow sensor data indicates that gas flow out of the sealed reservoir 106 (through valve 114) has significantly reduced or stopped, the controller instructs the heat engine 112 to switch-off (step S306), and the process returns to step S300. However, if the flow sensor data indicates that gas continues to flow out of the sealed reservoir 106 at an unacceptable rate, then the controller determines if a specified time T has lapsed since the heat engine 112 was switched-on (step S308). Time T may be a time which is determined from experiments/calibration of the container 100 and is the time it takes for condensation of evaporated liquified gas to be substantially completed. Alternatively, time T may be a maximum time for which the heat engine 112 may be run, for the purpose of power efficiency of the container, for example.

If at step S308, time T has not yet been reached, the controller allows the heat engine 112 to keep running (step S310). However, if at step S308, time T has been reached but gas is still flowing out of the sealed reservoir 106, then the controller may first instruct the heat engine 112 to switch off (step S312) and then may be configured to output a message or control signal indicating that liquified gas needs to be added to the sealed reservoir 106 (i.e. that the sealed reservoir 106 needs to be topped-up with more liquified gas from an external source) (step S314). As mentioned above, this may be achieved by using the communication module to communicate with a user of the container or with external devices/servers. In embodiments, at step S314, the controller may cause a warning light or similar to be displayed or for an alarm to be sounded if liquified gas needs to be added to the container. After the reservoir has been topped-up (either with gas that is condensed to provided liquified gas, or with liquified gas) such that the required volume of liquified gas is achieved, the process returns to step S300.

In embodiments, the methods shown in FIGS. 2 and 3 may be combined.

Thus, in embodiments, there is provided a method of monitoring the volume of liquified gas within the container, the method comprising: determining whether at least one sensor indicates that the volume of liquified gas is below a required volume and/or that evaporated liquified gas is flowing out of the sealed reservoir; and sending a control signal to switch on the heat engine, to condense any evaporated liquified gas in the sealed reservoir of the container.

The method may further comprise: determining whether, after a specified time, the at least one sensor indicates that the volume of liquified gas is still below a required volume; sending a control signal to switch off the heat engine; and outputting a message, responsive to the determining, indicating that liquified gas needs to be added to the sealed reservoir.

The method may further comprise: determining whether, after a specified time, the at least one sensor indicates that evaporated liquified gas is still flowing out of the sealed reservoir; sending a control signal to switch off the heat engine; and outputting a message, responsive to the determining, indicating that liquified gas needs to be added to the sealed reservoir.

Figure 4:
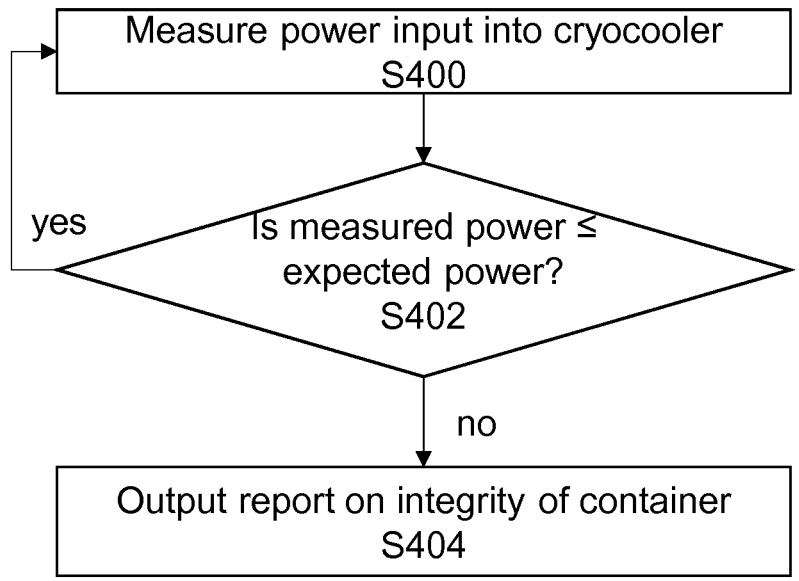
FIG. 4 is a flow diagram of example steps to monitor the integrity of the container of FIG. 1A.

FIG. 4 is a flow diagram of example steps to monitor the integrity of the container of FIG. 1A. As mentioned above, a controller may be coupled to a power meter, where the power meter measures power consumption of the heat engine 112 during operation. Thus, as step S400, the process involves measuring the power input into, or power consumed by, the heat engine 112. The controller may be configured to determine whether the measured power consumption of the heat engine 112 exceeds an expected power consumption (step S402). If the measured power consumption is equal to or below an expected power consumption, then the process may return to step S400. If the measured power consumption exceeds an expected power consumption, then the controller may output a report on the integrity of the container 100 (step S404). In this way, the integrity of the container 100 may be determined. For example, if the heat engine 112 is determined to be using more power than expected, then the container 100 may not be well-insulated or there may be a leak in the sealed reservoir which is causing liquified gas to evaporate or leak out of the container 100.

Thus, in embodiments, there is provided a method of monitoring integrity of the container, the method comprising: determining whether a measured power consumption of the heat engine of the container exceeds an expected power consumption; and outputting a report, responsive to the determining, on the integrity of the container if the measured power consumption exceeds an expected power consumption.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A container for cryopreserved biological samples, the container comprising:
   an insulated housing comprising a cavity for containing at least one cryopreserved biological sample;
   a sealed reservoir at least partly surrounding the cavity of the housing, the sealed reservoir comprising liquified gas, the container further comprising a heat transfer engine for condensing gas in the sealed reservoir to provide liquified gas, or cooling the liquified gas in the sealed reservoir; and
   an airflow mechanism comprising a chamber located between a gas inlet and an inlet valve.

2. The container as claimed in claim 1, wherein the sealed reservoir comprises at least one valve.

3. The container as claimed in claim 2, wherein the at least one valve is a pressure relief valve.

4. The container as claimed in claim 1, wherein the inlet valve is configured for filling the sealed reservoir with gas or liquified gas.

5. The container as claimed in claim 4, wherein the inlet valve is coupleable to the airflow mechanism to enable gas to flow into the sealed reservoir and to enable evaporated gas to flow out of the sealed reservoir.

6. The container as claimed in claim 5, wherein the chamber comprises an oxygen scavenger.

7. The container as claimed in claim 5, wherein the chamber comprises a desiccant.

8. The container as claimed in claim 4, wherein a flow sensor is provided within the inlet valve to detect fluid flow in and/or out of the sealed reservoir.

9. The container as claimed in claim 1, further comprising a heat exchanger coupled to the heat transfer engine, wherein the heat exchanger extends into the sealed reservoir to enable cooling to the liquified gas.

10. The container as claimed in claim 1, wherein the heat transfer engine is any one of: a cryocooler, a Kleemenco cycle cryocooler, a pulse tube cryocooler, an acoustic Stirling cryocooler, a Joule Thompson cryocooler, and a Stirling cryocooler.

11. The container as claimed in claim 1, further comprising at least one sensor in the sealed reservoir for sensing a volume of liquified gas within the sealed reservoir.

12. The container as claimed in claim 11, comprising a controller coupled to the at least one sensor, wherein the controller is configured to:
   determine whether the at least one sensor indicates that the volume of liquified gas is below a required volume; and
   send a control signal to the heat engine to switch on the heat engine, to condense any evaporated liquified gas in the sealed reservoir.

13. The container as claimed in claim 12, wherein the controller is further configured to:
   determine whether, after a specified time, the at least one sensor indicates that the volume of liquified gas is below a required volume;
   send a control signal to the heat engine to switch off the heat engine; and
   output a message, responsive to the determining, indicating that liquified gas needs to be added to the sealed reservoir.

14. The container as claimed in claim 1, further comprising a power meter for measuring power consumption of the heat engine when switched on.

15. The container as claimed in claim 14 further comprising a controller coupled to the power meter, wherein the controller is configured to:
   determine whether the measured power consumption of the heat engine exceeds an expected power consumption; and
   output a report, responsive to the determining, on the integrity of the container if the measured power consumption exceeds an expected power consumption.

16. The container as claimed in claim 1, further comprising vacuum insulation.

17. The container as claimed in claim 16, wherein the vacuum insulation is provided by one or more vacuum insulated panels.

18. The container as claimed in claim 1, further comprising a removable insulated lid, wherein the housing and the cavity are sealable by the removable lid.

19. The container as claimed in claim 1, wherein the liquified gas is any one or more of: liquified helium; liquified nitrogen; liquified air; and liquified oxygen.

20. The container as claimed in claim 1, wherein the container is for shipping cryopreserved biological samples.

21. A method of monitoring the volume of liquified gas within a container according to claim 1, the method comprising:
   determining whether at least one sensor indicates that the volume of liquified gas is below a required volume and/or that evaporated liquified gas is flowing out of the sealed reservoir; and
   sending a control signal to switch on the heat engine, to condense any evaporated liquified gas in the sealed reservoir of the container.

22. The method as claimed in claim 21 further comprising:
   determining whether, after a specified time, the at least one sensor indicates that the volume of liquified gas is still below a required volume;
   sending a control signal to switch off the heat engine; and
   outputting a message, responsive to the determining, indicating that liquified gas needs to be added to the sealed reservoir.

23. The method as claimed in claim 21 further comprising:
   determining whether, after a specified time, the at least one sensor indicates that evaporated liquified gas is still flowing out of the sealed reservoir;
   sending a control signal to switch off the heat engine; and
   outputting a message, responsive to the determining, indicating that liquified gas needs to be added to the sealed reservoir.

24. A method of monitoring integrity of a container according to claim 1, the method comprising:
   determining whether a measured power consumption of the heat engine of the container exceeds an expected power consumption; and
   outputting a report, responsive to the determining, on the integrity of the container if the measured power consumption exceeds an expected power consumption.

25. A non-transitory data carrier carrying code, which when implemented on a processor is configured to cause the processor to carry out the method of claim 21.

* * * * *